United States Patent
Hachikian et al.

(10) Patent No.: US 11,073,360 B2
(45) Date of Patent: Jul. 27, 2021

(54) BALLISTIC RESISTANT ARTICLE WITH THERMOSET POLYURETHANE MATRIX

(71) Applicant: BARRDAY INC., Cambridge (CA)

(72) Inventors: Zakar Raffi Hachikian, Chelmsford, MA (US); Michael Wayne Jarrett, Conover, NC (US); Kemel Sanjay Pawaroo, Cambridge (CA)

(73) Assignee: BARRDAY INC., Cambridge (CA)

( * ) Notice: Subject to any disclaimer, the term of this patent is extended or adjusted under 35 U.S.C. 154(b) by 0 days.

(21) Appl. No.: 16/485,918

(22) PCT Filed: Feb. 15, 2018

(86) PCT No.: PCT/US2018/018313
§ 371 (c)(1),
(2) Date: Aug. 14, 2019

(87) PCT Pub. No.: WO2018/152294
PCT Pub. Date: Aug. 23, 2018

(65) Prior Publication Data
US 2020/0041233 A1 Feb. 6, 2020

Related U.S. Application Data

(60) Provisional application No. 62/459,744, filed on Feb. 16, 2017.

(51) Int. Cl.
*F41H 5/04* (2006.01)
*B32B 5/26* (2006.01)
(Continued)

(52) U.S. Cl.
CPC ............. *F41H 5/0485* (2013.01); *B32B 5/26* (2013.01); *B32B 27/32* (2013.01); *B32B 27/34* (2013.01);
(Continued)

(58) Field of Classification Search
None
See application file for complete search history.

(56) References Cited

U.S. PATENT DOCUMENTS 5,115,007 A 5/1992 Chihara et al.
5,480,706 A 1/1996 Li et al.
(Continued)

FOREIGN PATENT DOCUMENTS

EP 2674294 6/2013
EP 3112797 1/2017

OTHER PUBLICATIONS

International Search Report and Written Opinion for International Application No. PCT/US2018/018313 completed May 3, 2018.
(Continued)

*Primary Examiner* — Reginald S Tillman, Jr.
(74) *Attorney, Agent, or Firm* — Carlson, Gaskey & Olds, P.C.

(57) ABSTRACT

A ballistic resistant article includes a first layer that has first unidirectional fibers disposed in a first polymer matrix. The first polymer matrix is composed of a thermoset polyurethane. A second layer is laminated to the first layer. The second layer includes second unidirectional fibers disposed in a second polymer matrix. The second unidirectional fibers are cross-oriented with respect to the first unidirectional fibers.

13 Claims, 1 Drawing Sheet

(51) Int. Cl.
*B32B 27/32* (2006.01)
*B32B 27/34* (2006.01)
*B32B 27/40* (2006.01)
*C08G 18/48* (2006.01)
*C08G 18/75* (2006.01)

(52) U.S. Cl.
CPC .......... *B32B 27/40* (2013.01); *C08G 18/4854* (2013.01); *C08G 18/75* (2013.01); *B32B 2571/02* (2013.01)

(56) References Cited

U.S. PATENT DOCUMENTS

| | | | | |
|---|---|---|---|---|
| 5,591,933 | A * | 1/1997 | Li | F41H 5/0485 |
| | | | | 156/93 |
| 6,846,548 | B2 * | 1/2005 | Harpell | F41H 5/0471 |
| | | | | 428/198 |
| 7,073,538 | B2 | 7/2006 | Bhatnager et al. | |
| 8,132,494 | B1 | 3/2012 | Nguyen et al. | |
| 2005/0176912 | A1 | 8/2005 | Shin et al. | |
| 2010/0035017 | A1 | 2/2010 | Green | |
| 2010/0287689 | A1 | 11/2010 | Sullivan | |
| 2013/0149931 | A1 * | 6/2013 | Rukavina | B32B 27/308 |
| | | | | 442/135 |
| 2014/0060308 | A1 * | 3/2014 | de Haas | F41H 5/0485 |
| | | | | 89/36.02 |

OTHER PUBLICATIONS

Supplementary European Search Report for European Patent Application No. 18753990.3 completed Dec. 4, 2020.

International Preliminary Report on Patentability for International Application No. PCT/US2018/018313 dated Aug. 29, 2019.

* cited by examiner

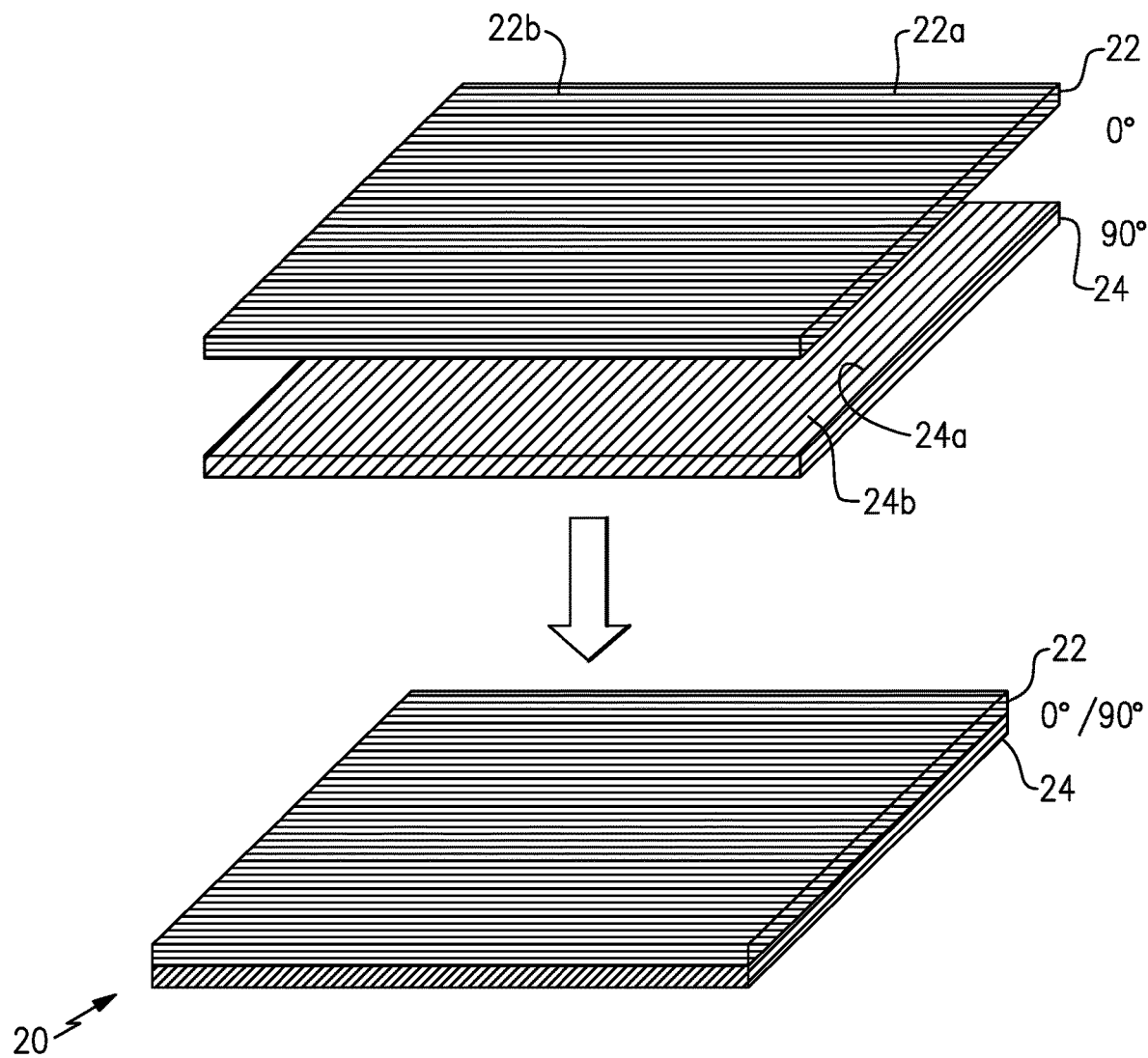

BALLISTIC RESISTANT ARTICLE WITH THERMOSET POLYURETHANE MATRIX

CROSS-REFERENCE TO RELATED APPLICATION

This application claims benefit of provisional application No. 62/459,744 filed Feb. 16, 2017.

BACKGROUND

Materials for ballistic resistance can include high strength fibers arranged in an elastomeric matrix. For instance, the fibers are arranged parallel to one another (unidirectional), although unidirectional, woven, non-woven, or other fiber configurations can be used. One or more layers of ballistic material are typically stacked or laminated (bonded) to form a ballistic resistant laminate sheet.

SUMMARY

A ballistic resistant article according to an example of the present disclosure includes a first layer that has first unidirectional fibers disposed in a first polymer matrix. The first polymer matrix is composed of a thermoset polyurethane. A second layer is laminated to the first layer. The second layer includes second unidirectional fibers disposed in a second polymer matrix. The second unidirectional fibers are cross-oriented with respect to the first unidirectional fibers.

A ballistic resistant article according to another example of the present disclosure includes a layer that has fibers disposed in a polymer matrix. The fibers are selected from polyolefin fibers, aramid fibers, and combinations thereof, and the polymer matrix is composed of a thermoset polyurethane.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example ballistic resistant article with a layer that has fibers and a thermoset polyurethane matrix.

DETAILED DESCRIPTION

FIG. 1 schematically illustrates a ballistic resistant article 20 ("article 20"). Although not particularly limited, the article 20 may be used in soft armor applications, such as personal body armor.

In the illustrated example, the article 20 includes a first layer 22 and a second layer 24 (also shown in an expanded view above article 20). The first layer 22 includes first fibers 22a, and the second layer 24 includes second fibers 24a. For instance, a fiber has a plurality of filaments. Most typically, the fibers are high strength ballistic fibers that have tenacity greater than 7 gpd, tensile modulus greater than 80 gpd and energy to break greater than 7 J/g. As examples, the fibers 22a/24a may be aramid fibers (e.g., para-aramid), polyolefin fibers, or combinations thereof. Polyolefin fibers include polyethylene fibers, polypropylene fibers, ultra-high molecular weight polyethylene (UHMWPE) fibers, and high molecular weight polypropylene fibers. While aramid and polyolefin fibers may be preferred, it will be appreciated that other types of fibers may additionally or alternatively be used.

In this example, the first fibers 22a are unidirectional fibers and the second fibers 24a are unidirectional fibers that are cross-oriented with the first fibers 22a. For instance, the first fibers 22a have a 0 degree orientation and the second fibers 24a have a 90 degree orientation. As can be appreciated, the selected orientations may vary and additional layers of other orientations may be used (e.g., 0/45, 0/45/90, etc.). Additionally or alternatively to unidirectional fiber configurations, woven or other fiber configurations can be used.

The first unidirectional fibers 22a are disposed in a first matrix 22b (white area among fibers in FIG. 1), and the second unidirectional fibers 24a are disposed in a second matrix 24b (white area among fibers in FIG. 1). The first polymer matrix 22b, the second polymer matrix 24b, or both are composed of a thermoset polyurethane. In this example, the layers 22/24 are in a laminated configuration in which the first layer 22 is in contact with, and coextensive with, the second layer 24.

A focus of ballistic resistance articles has been on ballistic performance. However, soft armor and other armor applications may be exposed to environmental conditions that have the potential to chemically degrade the armor and reduce performance. For instance the chemical degradation may be of the matrix. Environmental conditions may expose the matrix to water/moisture, ozone, fuel (e.g., kerosene) or other solvents, and the like. While elastomeric matrices provide good ballistic performance, at least some elastomeric materials have poor chemical resistance. In this regard, thermoset polyurethanes disclosed herein may provide improved chemical resistance versus elastomeric materials, while still maintaining good ballistic performance.

Unlike a "thermoplastic," a "thermoset" polymer refers to a polymer having bonds that are not reversible after the curing process. A thermoset resin may initially be in a soft or viscous state but irreversibly changes into an infusible, insoluble polymer network by curing. Curing may be induced by heat, radiation, and/or by catalyst or crosslinking agent. Thermoset polymers are typically characterized by a rigid, three-dimensional molecular structure, high molecular weight, and decomposition before melting. That is, a thermoset cannot be melted and re-shaped after curing.

The thermoset polyurethane may be formed by chemical reaction between isocyanate and polyol. The present disclosure may refer to the thermoset polyurethane being "derived" from one or more types of isocyanates or polyols. It is to be understood that such derivation implicates the final chemical structure of the polyurethane. That is, except for the change to the functional groups in the reaction, the chemistry of the isocyanate or polyol manifests in the final thermoset polyurethane. In this way, the isocyanate or polyol characterize the polyurethane.

The isocyanate and polyol react to form a prepolymer. To form the thermoset, the prepolymers are further reacted to form polymer chains or networks by the addition of the di- or multi-functional extenders to increase molecular weight and/or crosslinking. The thermoset polyurethane may be derived from a two component system or a one component system. For instance, in a two component system, the thermoset polyurethane is derived from cycloaliphatic isocyanate and one or more of polyester polyols, polycarbonate polyols, polycaprolactone polyols, polybutadiene polyols, or polysulfide polyols. For instance, in a one component system, the thermoset polyurethane is derived from aromatic isocyanate and one or more of polyester polyols, polycarbonate polyols, polycaprolactone polyols, polybutadiene polyols, or polysulfide polyol. Each of these systems and example chemistries are described in more detail below.

Two Component Polyurethane:

The isocyanate of example two component thermoset polyurethane systems can be aliphatic, cycloaliphatic, polycyclic or aromatic. Examples may include tolulene 2,4diisocyanate (TDI), 2,4'-diphenylmethane diisocyanate (MDI), xylene diisocyanate (XDI), meta-tetramethylxylylene diisocyanate (TMXDI), hydrogenated xylene diisocyanate (HXDI), naphthalene 1,5-diisocyanate (NDI), pphenylene diisocyanate (PPDI), 3,3'-dimethyldiphenyl-4, 4'-diisocyanate (DDDI), 1,6 hexamethylene diisocyanate (HDI), 2,2,4-trimethylhexamethylene diisocyanate (TMDI), isophorone diisocyanate (IPDI), 4,4'-dicyclohexylmethane diisocyanate (H12MDI), or norbornane diisocyanate (NDI), 4,4'-dibenzyl diisocyanate (DBDI). Representative example chemical structures of aromatic isocyanates MDI and TDI—are shown below. Representative example chemical structures of aliphatic and cycloaliphatic isocyanates HDI, IPDI, and H12MDI—are also shown below.

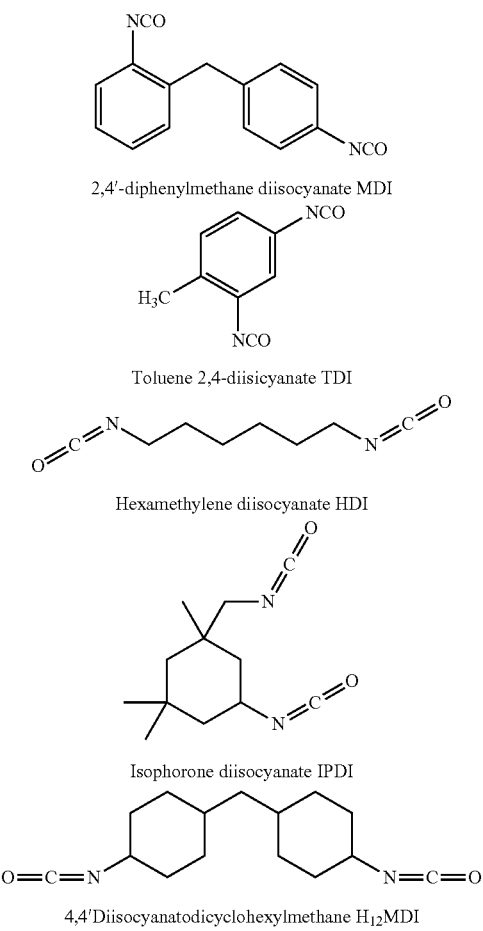

In one example, the isocyanate is H12MDI. In comparison to MDI, the H12MDI has slow reactivity with aromatic amine extenders. The H12MDI thus permits time for processing once the prepolymer is mixed with the amine H12MDI is also less sensitive to moisture and in monomeric form, it has very low vapor pressure (better for low volatilization in the surroundings). The H12MDI also yields good weathering performance, oxidation resistance, and ultra-violet radiation resistance in the final article.

The polyol of example two component thermoset polyurethane systems can be polyether polyol, polyester polyol, polycarbonate polyol, polycaprolactone polyol, polybutadiene polyol, or polysulfide polyol. The molecular weight of the polyol can generally be in the range of 500-3000. In further examples, the molecular weight is 1000-2000 or 1000-1500. In further examples, the polyol is a polyether polyol that includes at least one of polytetramethylene ether glycol (PTMEG), polypropylene glycol (PPG) or polyethylene glycol, and combinations thereof. Several example representative chemical structures of polyether and polyester polyols are shown below.

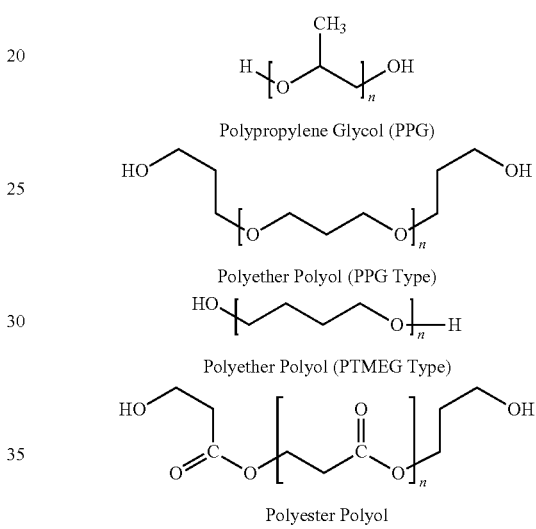

The isocyanate and the polyol react to form a prepolymer. Several representative examples of the reaction are shown below for HMDI/PTMEG and for TDI/polyester polyol. For example, the prepolymer is prepared in a reactor. The polyol and isocyanate are added into the reactor in a stoichiometric ratio of more than 1:1 in favor of isocyanate to cap all the polyol molecules with isocyanate, forming the prepolymer. For instance, the reactor is heated and the polyol and isocyanate are mixed under an inert cover gas to avoid moisture getting into the mixture and reacting with the isocyanate. A catalyst may be added to accelerate the reaction.

Reaction Example 1

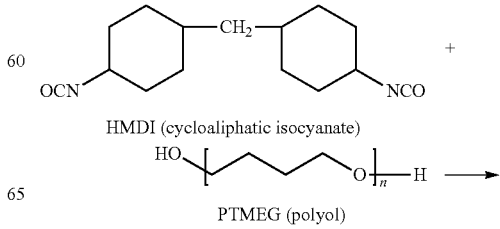

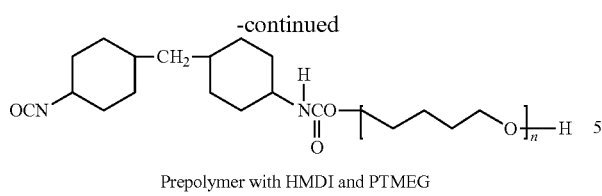

Prepolymer with HMDI and PTMEG

Reaction Example 2

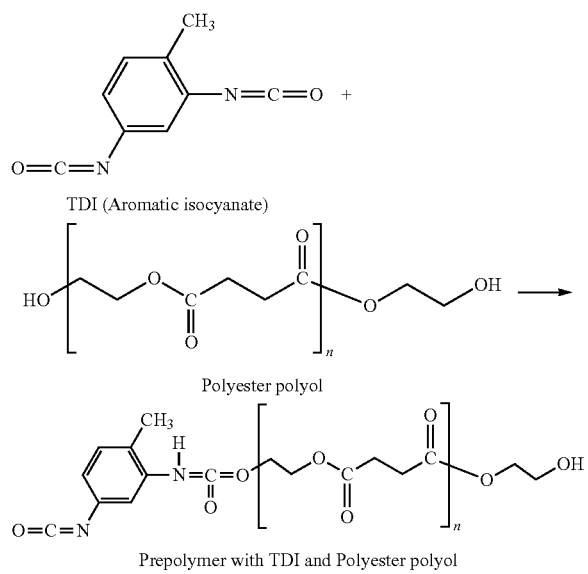

In one example, the polyol is PTMEG. In comparison to PPG, the PTMEG yields balanced properties for flexibility, tensile strength, and elongation in the final article, which may contribute to good ballistic performance. The PTMEG also yields good water and moisture resistance because it does not have sensitivity to water that the polyester polyols may exhibit. The PTMEG thus provides good overall chemical resistance overall, especially for kerosene, which is a key performance criteria in some applications.

The prepolymer is then cured by reacting it with chain extenders. Diols (example representative chemical structures shown below), aliphatic, cycloaliphatic, or aromatic diamines, polyols, or polyamines can be used as chain extenders. In a further example, the chain extender is the diamine extender and is diethyltoluenediamine (DETDA), the chemical structure for which is also shown below.

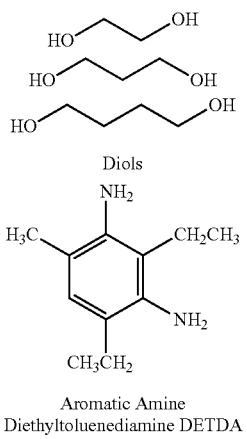

The prepolymer can then be polymerized and the final product can be obtained by reacting the prepolymer with the chain extenders. In one example, the extender is in DETDA in a stoichiometric ratio of more than 1:1 in favor of the prepolymer. The prepolymer and the DETDA are thoroughly mixed. If needed, viscosity can be reduced by adding solvents, such as a ketone solvent. The mixture of the prepolymer, chain extender, and solvent can then be used to coat the fibers 22a or 22b. The mixture can then be cured at ambient temperature, or an elevated temperature if more rapid cure is desired. A representative example of the formation of the prepolymer and curing is shown below.

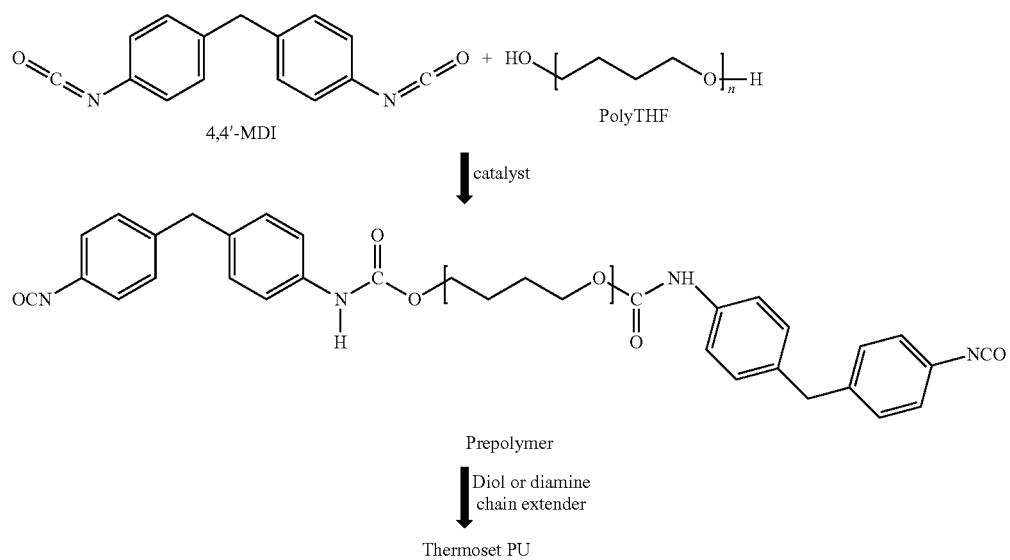

One-Component Polyurethane Resin System:

The isocyanate and polyol of the one component thermoset polyurethane systems can be as set forth above for the two component system. In the one component system, a blocking agent is added to the prepolymer to cap the isocyanate and reduce or prevent reaction. The blocking agents can be alcohol, caprolactam, phenol, oxime, pyrazole or malonates. In one further example, the blocking agent is an oxyrime, such as methylethylketoxime (MEKO).

The blocking agent is added to the prepolymer to produce a one-component urethane resin. For instance, the prepolymer, blocking agent, and catalyst if desired, are placed into a reactor with an inert cover gas. The contents of the reactor are mixed and heated to accelerate reaction between the isocyanate and the blocking agent. The stoichiometric ratio of isocyanate to blocking agent is more than 1:1 in favor of isocyanate.

The capped prepolymers can subsequently be cured by reaction with chain extenders, which may be as set forth above for the two component system. The chain extender, such as DETDA, may be mixed with the blocked prepolymer in a stoichiometric ratio of more than 1:1 in favor of blocked prepolymer. If needed, viscosity can be reduced by adding solvents, such as a ketone solvent. The prepolymer, extender, and solvent can then be used for coating the fibers 22a or fibers 22b. In order to cure the prepolymer, the prepolymer must be de-blocked. This can be achieved by heating for a period of time. The applied heat and the exposure time depend on the thickness and the type of the blocking agent used.

Whether the one or two component system is used, the article 20 can be fabricated using known laminating techniques by first making unidirectional monolayer sheets. Two monolayer sheets are then cross-plied and laminated to form the article 20. To make a monolayer sheet, uncured polyurethane is coated onto unidirectional fibers and dried to form a unidirectional layer. Two unidirectional layers, each with unidirectional fibers and uncured polyurethane, are then cross-plied and pressed under heat, to cure the polyurethane and thereby also bond the two unidirectional layers together. Although the article 20 may most typically be provided as a multi-layer structure as in the example in FIG. 1, it will be appreciated that the article could alternatively include additional layers, which may be either different from the layers 22/24 or identical to one or both of the layers 22/24. The article 20 may also be provided as a monolayer, with only one of the layers 22/24 that has the thermoset polyurethane matrix.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A ballistic resistant article comprising:
a first layer including first unidirectional fibers disposed in a first polymer matrix, the first polymer matrix being composed of a thermoset polyurethane derived from cycloaliphatic isocyanate and polyether polyol, wherein the polyether polyol is polytetramethylene ether glycol (PTMEG) and the thermoset polyurethane is 4,4'-dicyclohexylmethane diisocyanate (H12MDI); and
a second layer laminated to the first layer, the second layer including second unidirectional fibers disposed in a second polymer matrix, the second unidirectional fibers being cross-oriented with respect to the first unidirectional fibers.

2. The ballistic resistant article as recited in claim 1, wherein the thermoset polyurethane includes a blocking agent selected from the group consisting of alcohol, caprolactam, phenol, oxime, pyrazole, malonate, and combinations thereof.

3. The ballistic resistant article as recited in claim 1, wherein the first unidirectional fibers and the second unidirectional fibers include polyolefin fibers or aramid fibers.

4. The ballistic resistant article as recited in claim 1, wherein the first layer is in contact with, and coextensive with, the second layer.

5. A ballistic resistant article comprising:
a first layer including first unidirectional fibers disposed in a first polymer matrix, the first polymer matrix being composed of a thermoset polyurethane derived from cycloaliphatic isocyanate and polyether polyol, wherein the polyether polyol is polytetramethylene ether glycol (PTMEG) and the isocyanate is isophorone diisocyanate (IPDI); and
a second layer laminated to the first layer, the second layer including second unidirectional fibers disposed in a second polymer matrix, the second unidirectional fibers being cross-oriented with respect to the first unidirectional fibers.

6. The ballistic resistant article as recited in claim 5, wherein the thermoset polyurethane is further derived from a blocking agent that caps the isocyanate, and the blocking agent includes oxime.

7. The ballistic resistant article as recited in claim 5, wherein the thermoset polyurethane is further derived from a blocking agent that caps the isocyanate, and the blocking agent includes pyrazole.

8. The ballistic resistant article as recited in claim 5, wherein the thermoset polyurethane is further derived from a blocking agent that caps the isocyanate, and the blocking agent includes malonate.

9. A ballistic resistant article comprising:
a first layer including first unidirectional fibers disposed in a first polymer matrix, the first polymer matrix being composed of a thermoset polyurethane derived from cycloaliphatic isocyanate and polyether polyol, wherein the polyether polyol is polytetramethylene ether glycol (PTMEG) and the isocyanate is tolulene 2,4diisocyanate (TDI); and
a second layer laminated to the first layer, the second layer including second unidirectional fibers disposed in a second polymer matrix, the second unidirectional fibers being cross-oriented with respect to the first unidirectional fibers.

10. The ballistic resistant article as recited in claim 9, wherein the thermoset polyurethane is further derived from a blocking agent that caps the isocyanate, and the blocking agent includes oxime.

11. The ballistic resistant article as recited in claim 9, wherein the thermoset polyurethane is further derived from a blocking agent that caps the isocyanate, and the blocking agent includes pyrazole.

12. The ballistic resistant article as recited in claim 9, wherein the thermoset polyurethane is further derived from a blocking agent that caps the isocyanate, and the blocking agent includes malonate.

13. A ballistic resistant article comprising:
- a first layer including first unidirectional fibers disposed in a first polymer matrix, the first polymer matrix being composed of a thermoset polyurethane derived from cycloaliphatic isocyanate, polyether polyol, and a blocking agent that caps the isocyanate, and the blocking agent selected from the group consisting of oxime, pyrazole, malonate, and combinations thereof; and
- a second layer laminated to the first layer, the second layer including second unidirectional fibers disposed in a second polymer matrix, the second unidirectional fibers being cross-oriented with respect to the first unidirectional fibers.

* * * * *